US007603697B1

(12) United States Patent  (10) Patent No.: US 7,603,697 B1
Kupsh et al.  (45) Date of Patent: Oct. 13, 2009

(54) METHOD AND SYSTEM FOR SECURELY DELIVERING AUTHENTICATION-RELATED DATA

(75) Inventors: Jerry Kupsh, Concord, CA (US); Xuming Chen, San Ramon, CA (US)

(73) Assignee: Cellco Partnership, Bedminster, NJ (US)

( * ) Notice: Subject to any disclaimer, the term of this patent is extended or adjusted under 35 U.S.C. 154(b) by 726 days.

(21) Appl. No.: 10/449,842

(22) Filed: May 30, 2003

(51) Int. Cl.
*H04L 9/32* (2006.01)
*G06F 7/04* (2006.01)
*H04K 1/00* (2006.01)

(52) U.S. Cl. ............ 726/2; 726/3; 726/4; 380/33; 380/247; 380/248; 380/249; 380/250; 380/270; 380/273

(58) Field of Classification Search ............ 726/2–4
See application file for complete search history.

(56) References Cited

U.S. PATENT DOCUMENTS

| | | | | |
|---|---|---|---|---|
| 6,147,980 | A * | 11/2000 | Yee et al. | 370/316 |
| 6,477,644 | B1 * | 11/2002 | Turunen | 713/161 |
| 6,785,823 | B1 * | 8/2004 | Abrol et al. | 726/7 |
| 7,003,307 | B1 * | 2/2006 | Kupsh et al. | 455/466 |
| 7,181,252 | B2 * | 2/2007 | Komsi | 455/567 |
| 2002/0119793 | A1 * | 8/2002 | Hronek et al. | 455/466 |
| 2004/0008656 | A1 * | 1/2004 | Qu et al. | 370/342 |

FOREIGN PATENT DOCUMENTS

WO WO 03030474 A2 * 4/2003

OTHER PUBLICATIONS

Short Message Peer to Peer Protocol Specification v3.4, Oct. 12, 1999, SMPP Developers Forum, p. 8.*
Section 2.312 of TIA/EIA Interim Standard IS-95, "Mobile Station-Base Station Compatibility Standard for Dual-Mode Wideband Spread Spectrum Cellular System", Jul. 1993.
TIA/EIA/IS-637-B, "Short Message Services for Wideband Spread Spectrum Systems", Jan. 2002.

* cited by examiner

*Primary Examiner*—Benjamin E Lanier
(74) *Attorney, Agent, or Firm*—McDermott Will & Emery LLP

(57) ABSTRACT

A method and system for providing secure communications for transmitting data to and from a wireless device includes components that facilitate sending authentication-related data to a wireless device using a secure channel of a first protocol; and utilizing the authentication-related data to facilitate secure communications between the wireless device and an enhanced wireless service. The secure communications between the wireless device and the enhanced wireless service utilizes a second protocol.

7 Claims, 2 Drawing Sheets

METHOD AND SYSTEM FOR SECURELY DELIVERING AUTHENTICATION-RELATED DATA

FIELD OF INVENTION

The present invention is directed to wireless communications. More particularly, the present invention is directed to a method and system for securely transmitting authentication-related data to a wireless device.

BACKGROUND

Enhanced wireless services and applications provided to wireless carrier subscribers continue to increase in popularity. For example, services such as multimedia messaging and mobile gamming applications, which allow a wireless subscriber to exchange graphics-based messages and to play video games using their wireless handsets, are currently offered to subscribers on wireless networks such as the CDMA1XRTT Code Division Multiple Access (hereinafter "CDMA") wireless system operated by Verizon Wireless®.

To facilitate operation and transmission of enhanced wireless services, wireless systems utilize a packet-based protocol, such as the Internet Protocol (hereinafter, "IP"), to transmit data between the wireless system and a subscriber's handset. The packet-based protocol that is utilized is generally a higher level protocol than the basic transmission protocol of the wireless system. In other words, if one considers a wireless network protocol such as CDMA to be a Layer Two (or data link layer) protocol in accordance with the Open System Interconnection (hereinafter, "OSI") system of protocol layer categorization, then the higher level packet-based protocol may be considered a Layer Three (or network layer) protocol which resides on top of the Layer Two protocol.

Packet-based protocol functionality is provided in a wireless system by Layer Three hardware components, such as Lucent Technologies' Packet Control Function (hereinafter, "PCF") and Packet Data Services Node (hereinafter "PDSN"), which are well known in the art. To facilitate packet-based protocol communications, wireless handsets operating on a wireless network are provided with a packet-based protocol software client, e.g., an IP client, which allows the wireless handset to easily download, run and communicate with packet-based protocol enhanced wireless services via the wireless system. Thus, application developers utilizing IP as the transport mechanism of the enhanced wireless services are freed from the constraints and complexities associated with CDMA-level programming and can instead focus on developing platform-independent IP-based applications that can run on any type of network, whether they be CDMA networks, Time Division Multiple Access (hereinafter, "TDMA") networks or Global System for Mobile Communications (hereinafter, "GSM") networks. Because the packet-based protocol layer generally operates independent of the wireless network protocol, wireless carriers can provide their subscribers with a variety of enhanced wireless services and applications created by third-party vendors without the need to radically redesign or compromise the security of their networks.

Wireless network protocols, such as CDMA, provide secure voice and data transmission through the use of authentication services. Authentication services generally utilize authentication keys to help insure that a wireless device is authorized or otherwise permitted by the wireless carrier to place a call on the wireless network. For example, the well-known TTA/EIA IS-95 standard defines the use of authentication keys for CDMA networks (See TIA/EIA IS-95, Section 2.3.12). Although the underlying transmission of data between the wireless network and the wireless handset may be authenticated at the wireless network protocol level, communications between a wireless handset and an enhanced wireless service utilizing a packet-based network layer protocol generally is not authenticated. Thus, while a subscriber's wireless handset may be authenticated by the wireless service provider to operate on its wireless network, the subscriber's wireless handset may not be authorized to utilize a particular packet protocol-based application. The lack of an easily configurable secure channel for delivering an authentication key to an IP client resident on a subscriber's handset has prevented the use of authentication keys with packet protocol-based enhanced services. The possibility of fraudulently accessing enhanced services has thus become a concern for third-party providers of enhanced wireless services as well as wireless carriers.

What is desired, therefore, is a method and system that allows an authentication key or other authentication-related data, to be delivered to a wireless handset in a secure manner to thereby ensure authorized use of a packet-based enhanced service by a wireless handset.

SUMMARY

An embodiment of a method performed in accordance with the present invention includes the steps of: (1) sending authentication-related data to a wireless device using a secure channel of a first protocol; and (2) utilizing the authentication-related data to facilitate secure communications between the wireless device and an enhanced wireless service. The secure communications between the wireless device and the enhanced wireless service utilizes a second protocol.

Another embodiment of a method performed in accordance with the present invention includes the steps of: (1) generating an authentication key; (2) sending the authentication key to a short messaging service center; (3) creating a short message containing the authentication key; and (4) sending the short message containing the authentication key to a wireless device of a subscriber of the wireless network. The wireless device utilizes the authentication key to securely communicate with an enhanced wireless application server.

Yet another embodiment of a method of the present invention includes the steps of: (1) sending authentication-related data to a wireless device using a secure channel of an OSI Layer Two protocol; and (2) utilizing the authentication-related data to facilitate secure communications between the wireless device and an enhanced wireless service. The secure communications between the wireless handset and the enhanced wireless service utilizes an OSI Layer Three protocol.

An embodiment of a system of the present invention includes: (1) a wireless network for facilitating wireless voice and data communications for a subscriber of the wireless network; (2) a wireless device, the wireless handset being utilized by the subscriber of the wireless network to communicate with the wireless network using a first protocol; (3) a wireless enhanced application server for providing an enhanced wireless application to the subscriber of the wireless network via the subscriber's wireless device, the subscriber's wireless device communicating with the enhanced application server utilizing a second protocol; and (4) a short message service center for receiving authentication-related data, and for sending the authentication-related data to the wireless device. The wireless device is programmed to utilize the authentication-related data to facilitate communications with the wireless enhanced application server.

It is understood that the foregoing is not intended to limit the present invention, but is meant to briefly summarizes some of the representative features of the present invention. The scope of the present invention is defined solely by the claims which are presented at the end of this document.

BRIEF DESCRIPTION OF THE DRAWINGS

The foregoing and other features of the present invention will be more readily apparent from the following detailed description and drawings of exemplary embodiments of the invention in which.

DESCRIPTION OF AN EXEMPLARY EMBODIMENTS OF THE INVENTION

In an exemplary embodiment of the present invention, the Short Message Service (hereinafter "SMS") provided by an IS-95 CDMA based network is utilized as a secure channel for delivering an authentication key or other authentication-related data to a wireless handset for use by the wireless handset in conducting secure communications with an enhanced wireless service or application via a packet-based protocol.

Figure 1:
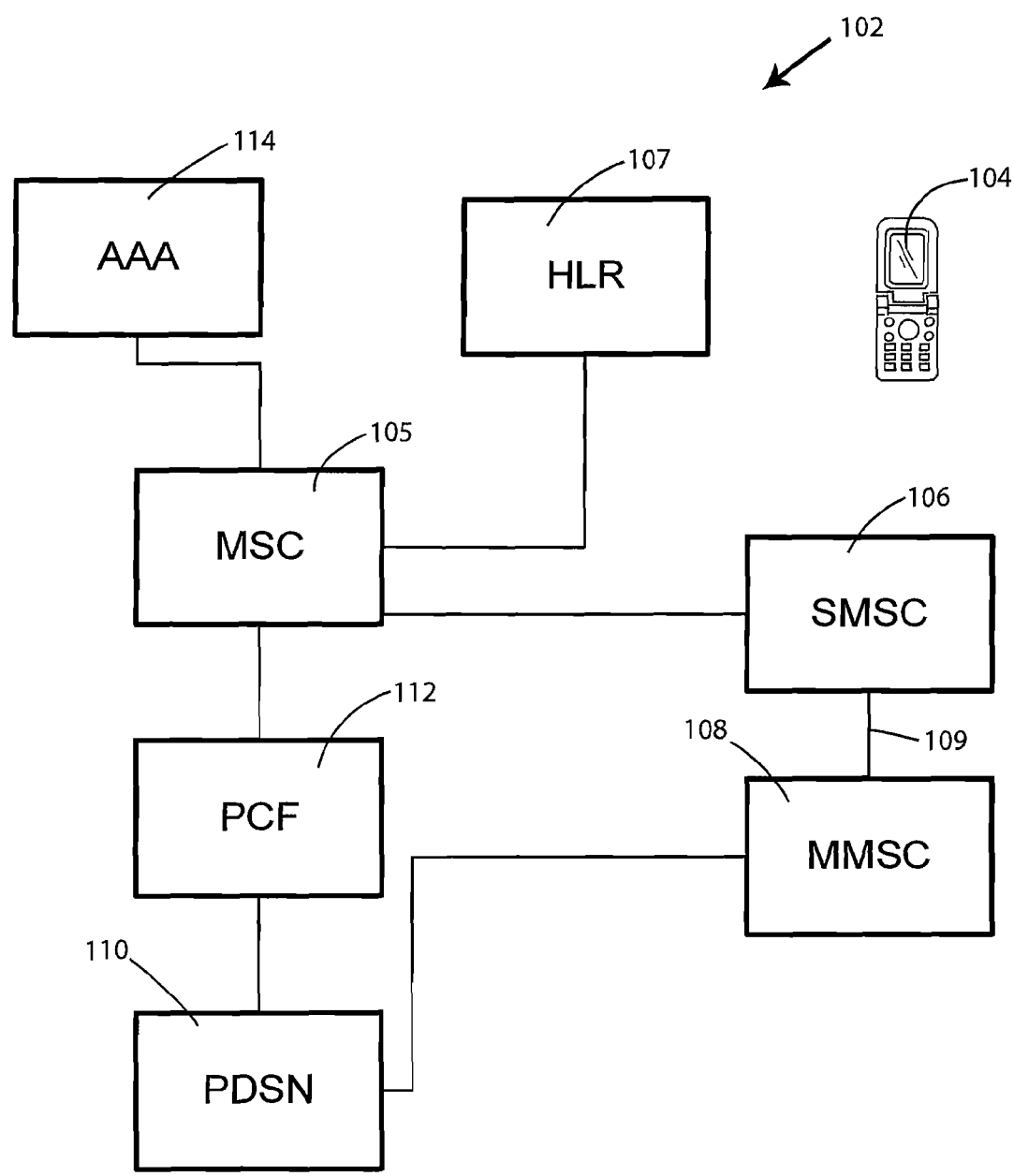
FIG. 1 illustrates, in block diagram form, interconnected components a communications network for securely providing authentication-related data to a wireless handset.

FIG. 1 illustrates, in block diagram form, an exemplary system wherein the present invention may be utilized. FIG. 1 includes a wireless network 102 which, in the present example, is a CDMA-based wireless network, such as a CDMA1XRTT wireless network. Wireless network 102 contains various components for facilitating transmission and delivery of voice and other information data to allow a user of a wireless handset 104 to make and receive wireless calls. Among the many components of a known wireless network, wireless network 102 of FIG. 1 includes a Short Message Service Center (hereinafter, "SMSC") 106. As is known in the art, SMSC 106 is a messaging device that facilitate reception and delivery for short text messages to and from subscribers of wireless reception and delivery of short text messages to and from subscribers of wireless network 102, such as a subscriber utilizing wireless handset 104. Operation of SMSC 106 is well known in the art and is standardized for CDMA systems in the publicly available standard, TIA/EIA IS-637B.

As is known in the art, SMSC 106 is connected to a mobile switch (hereinafter, "MSC") 105. The primary function of MSC 105 is to switch wireless calls between their points of origination and their respective destinations. Also as known in the art, a Home Location Register (hereinafter "HLR") 107 is connected to MSC 105 to provide user profile information concerning subscribers to wireless network 102 and an Authentication Authorization and Accounting server (AAA 114) is also connected to MSC 106 to facilitate authentication of subscribers with respect to 1XRTT services.

Continuing with the system illustrated in FIG. 1, an IP-based enhanced wireless service application server, in this case a Multi-Media Messaging Service Center (hereinafter, "MMSC") 108, is illustrated as an adjunct component of wireless network 102. An MMSC is a known device for facilitating delivery of multi-media messages, e.g., pictures and ring tones, to wireless handsets. MMSC 108, similar to any known IP-based application servers operating on wireless networks, utilizes IP to communicate with an IP software client resident in wireless handset 104. Also illustrated in FIG. 1 is a Packet Data Service Node ("PDSN") 110 and a Packet Control Function ("PCF") 112 connected between MMSC 108 and MSC 105, which, as described previously in the Background section of this document, are both known devices in the art for facilitating the routing of IP packets to their intended destinations. Although only one of each of the above-described components of FIG. 1 are illustrated in FIG. 1, it is understood that wireless network 102 may include multiple such components to provide voice and data services to a large and geographically disparate subscriber base.

The operation of the above-described exemplary system of the present invention proceeds generally as follows. While a subscriber's wireless handset may be authenticated by the wireless service provider to operate on its wireless network, the subscriber's wireless handset may not be authorized to utilize a particular packet protocol-based application. MMSC 108 utilizes the SMS service provided by SMSC 106 to deliver an authentication key or other authentication-related data to wireless handset 104 when a subscriber utilizing wireless handset 104 initially subscribes to an enhanced wireless service offered by MMSC 108, e.g., multi-media messaging. The enhanced wireless service sends the authentication key or authentication-related data to wireless handset 104 via the data field of an SMS message. A physical data connection between SMSC 106 and MMSC 108, preferably utilizing the known Short Message Peer to Peer (hereinafter, "SMPP") protocol, version 5.0, is utilized by MMSC 108 to send the authentication key to SMSC 106. MMSC 108 and the IP software client resident in wireless handset 104 thereafter utilize the authentication key or other authentication-related data as a means of verifying the identity of wireless handset 104. Because an SMS message is already an authenticated and secure channel of communications, secure delivery of the authentication key for use by the enhanced wireless service and wireless handset 104 may be realized.

Figure 2:
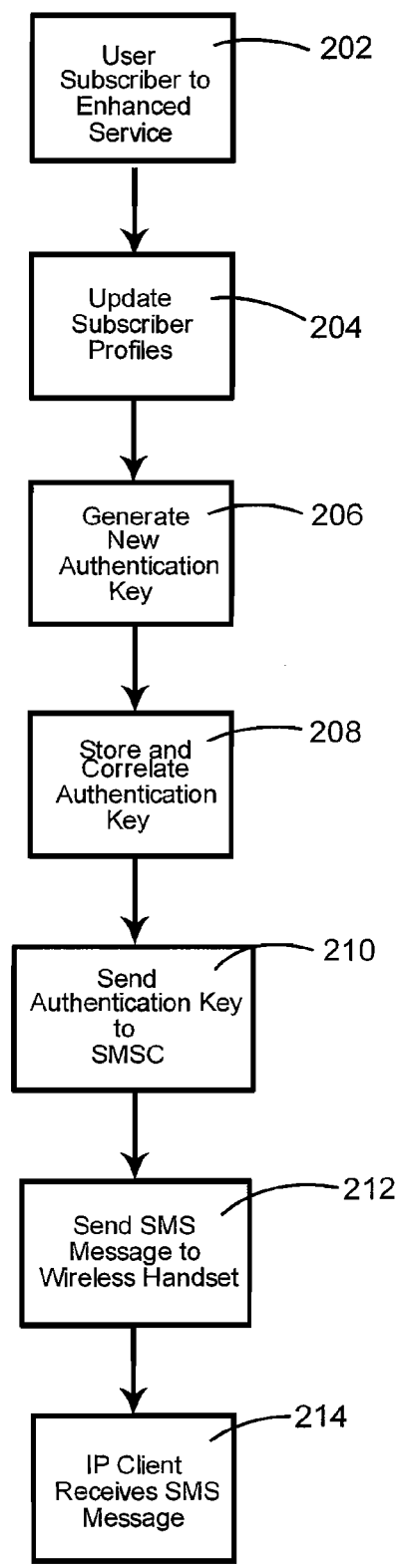
FIG. 2 illustrates, in flow chart form, a method for providing authentication-related data to a wireless handset for use by the wireless handset in facilitating communications with an enhanced wireless service.

FIG. 2 describes, in greater detail, the above-described exemplary method of the present invention with continued reference to the system illustrated in FIG. 1.

The process begins at step 202 of FIG. 2 where a user of wireless network 102 subscribes to a packet protocol-based enhanced wireless service such as multimedia messaging or a special ring tone service. While a subscriber's wireless handset may be authenticated by the wireless service provider to operate on its wireless network, the subscriber's wireless handset may not be authorized to utilize a particular packet protocol-based application. A subscription to the service may be initiated at the point of sale of the wireless network provider or via the wireless provider's web site or at any physical or logical location where the subscriber of wireless handset 104 can be identified, the subscriber's wireless account can be verified to insure that it is current, and any other verifications deemed necessary can be made.

At step 204, upon approval of the user's request to subscribe to the desired enhanced service, the user's subscriber profile in various databases of wireless network 102 are updated to reflect the user's new subscription to the enhanced service. The updated databases include HLR 107 and AAA 114. The update of the user profiles in HLR 107 and AAA 114 facilitates proper service and service level reception of the subscribed service by the subscriber.

At step 206, MMSC 108 generates a new authentication key or other authentication-related data for use by wireless handset 104 and MMSC 108 in authenticating future packet-based communication between the devices. Authentication keys may be generated in a pseudo-random fashion utilizing any of the known methods in the art for generating data for use in authenticating data communications. Alternatively, a separately-networked device may be utilized to generate the authentication-related data independent of or in conjunction with MMSC 108.

At step 208, MMSC 108 stores the authentication key generated at step 206 in a resident or off-site database and correlates the authentication key with the wireless handset subscriber's Mobile Identification Number (hereinafter, "MIN") or, more preferably, with the subscriber's Mobile Directory Number (hereinafter, "MDN"). In this manner the authentication key may be easily referenced by MMSC 108 using the basic identification information associated with the subscriber's wireless handset 104.

At step 210, the authentication key is sent for delivery to mobile handset 104 via SMSC 106 along with identifying information of the mobile handset 104, i.e. the MDN. In accordance with a preferred embodiment of the invention, the authentication key is sent from MMSC 108 to SMSC 106 in the normal manner using an SMPP connection 109.

At step 212, SMSC 106 receives the authentication key and the subscriber's MDN and creates and sends an SMS message to wireless handset 104 in the normal manner. The size of the authentication key is limited only by the size of a message text that can be carried by the SMS message. For standard SMS messaging, the size of the message text can be between 1 and 160 characters, thus, the size of the authentication key may be as great as 160 characters. The specific configuration and payload capacity of SMS on wireless network 102 determines the limit of the size of the authentication key. As mentioned above, SMS messages are delivered via a secure and authenticated communication channel, thus secure delivery of the authentication key for use by MMSC 108 and wireless handset 104 is ensured.

Continuing with the process illustrated in FIG. 2, at step 214, the IP software client in wireless handset 104, receives, via SMS, the authentication key created by MMSC 108 and delivered via SMSC 106. The IP software client in wireless handset 104 thereafter utilizes the authentication key for facilitating secure communications with MMSC 108.

The possible uses of the authentication key received via the SMS message are varied and many. As one example, when wireless handset 104 sends a multi-media mobile message to a desired recipient via MMSC 108, the IP software client in wireless handset 104 attaches the authentication key to the multi-media message. Wireless handset 104 also sends its MDN. Upon receipt of the information received from wireless handset 104, MMSC 108 reviews the authentication key and the MDN to insure that wireless handset 104 is authorized to utilize the multi-media messaging service provided by MMSC 108. Similarly, when MMSC 108 delivers a multi-media message to wireless handset 104, MMSC 108 includes the authentication key of wireless handset 104. Wireless handset 104 processes the multi-media message only if the received authentication key matches the stored authentication key for multi-media messaging of wireless handset 104.

The above-described exemplary embodiment of the present invention utilizes known components of wireless networks and enhanced packet protocol-based wireless services on wireless networks. One skilled in the art is readily capable of programming MMSC 108 and the IP software client of wireless handset 104 in a manner that allows authentication-related data to be sent to the IP-client software via SMS messaging. Additionally, one skilled in the art will be capable of programming MMSC 108 to generate and maintain a database of the authentication-related data, such as authentication keys, and associated identification data of the various subscribers.

Although the above-described exemplary embodiment of the present invention focused on a multi-media messaging service operating on an IP-based packet protocol via a CDMA network, it is understood that the present invention is equally applicable for us with any enhanced wireless service or application utilizing any packet-based or non-packet-based protocol via any type of wireless network protocol wherein it is desired to securely send an authentication key or other authentication-related data to a wireless handset for the purpose of providing authentication information. For example, the present invention may be utilized with a packet-protocol based multi-player gaming application, ring tone delivery or Push-to-Talk service running on a CDMA, TDMA or GSM network. Moreover, it is understood that the present invention is not limited to only traditional voice-oriented wireless handsets that are capable of running enhanced services, but is equally applicable to other wireless devices, e.g., Personal Digital Assistants ("PDAs") that run data applications in conjunction with mobile wireless connectivity.

It is understood that additional variations of the above-described exemplary embodiments may fall within the scope of the present invention, which invention is defined solely by the claims which follows.

We claim:

1. A method for providing secure communications for a multi-media message service (MMS) application service through a wireless network, comprising the steps of:

receiving a request for a subscriber to initiate a new subscription to the MMS application service, the subscriber currently having an account with a wireless service provider such that a mobile station of the subscriber has already been authenticated by the wireless service provider to operate on the wireless network but the mobile station of the subscriber has not yet been authorized to utilize the MMS application service;

in response to the request to initiate the new subscription to the MMS application service, generating authentication-related data;

transferring a short message peer-to-peer (SMPP) protocol message containing the authentication data generated in response to the request to initiate the new subscription to the MMS application service, to a short message service center (SMSC) coupled to the wireless network;

sending the authentication-related data generated in response to the request to initiate the new subscription to the MMS application service, in a short message service (SMS) protocol message, through the wireless network from the SMSC to the mobile station of these subscriber;

correlating an identification of the mobile station of the subscriber to the authentication-related data generated in response to the request to initiate the new subscription to the MMS application service;

making the correlation of the mobile station to the authentication-related data generated in response to the request to initiate the new subscription to the MMS application service accessible to an application server coupled to the wireless network, wherein the application server is configured to operate as a multi-media message service center (MMSC); and utilizing said authentication-related data generated in response to the request to initiate the new subscription to the MMS application service, at the mobile station and the MMSC, to facilitate a secure communication of one or more application messages, of the MMS application service, between the mobile station and the MMSC via a packet communication session through the wireless network.

2. The method of claim 1, wherein the correlating step correlates the authentication-related data with at least one of the Mobile Identification Number (MIN) and Mobile Directory Number (MDN) of the mobile station, as the identification of the mobile station of the subscriber.

3. The method of claim 1, wherein the secure communication between the mobile station and the MMSC utilizes a packet communication protocol other than the SMS protocol.

4. The method of claim 3, wherein the mobile station includes a software client for packet-based protocol communications which communicates using the authentication-related data sent via the secure channel of the SMS protocol message.

5. The method of claim 1, wherein the authentication-related data comprises an authentication key for authenticating the mobile station of the subscriber to the MMSC.

6. A system for providing secure wireless communications for a multi-media message service (MMS) application service to a mobile station of a subscriber, comprising:
- a wireless network, the subscriber currently having an account with a wireless service provider such that the mobile station of the subscriber has already been authenticated by the wireless service provider to operate on the wireless network but the mobile station of the subscriber has not yet been authorized to utilize the MMS application service;
- a short message service center (SMSC) coupled to the wireless network configured for receiving a short message peer-to-peer (SMPP) protocol message containing authentication-related data generated for the mobile station in response to a request for the subscriber to initiate a new subscription to the MMS application service, and for sending the authentication-related data generated for the mobile station in response to a request for the subscriber to initiate a new subscription to the MMS application service in a short message service (SMS) protocol message through the wireless network to the mobile station of the subscriber; and
- an application server comprising a multi-media message service center (MMSC) coupled to the wireless network configured for correlating an identification of the mobile station of the subscriber to the authentication-related data generated for the mobile station in response to a request for the subscriber to initiate a new subscription to the MMS application service, and for utilizing the authentication-related data generated for the mobile station in response to a request for the subscriber to initiate a new subscription to the MMS application service to facilitate a secure communication of one or more messages of the MMS application service with the mobile station via a packet communication session through the wireless network.

7. The system of claim 6, wherein the wireless network includes a Packet Data Service Node (PDSN) for packet routing including routing of packets between the mobile station and the MMSC for the application service.

* * * * *